(12) United States Patent
Ermilov

(10) Patent No.: US 9,039,334 B2
(45) Date of Patent: May 26, 2015

(54) METHODS AND APPARATUSES FOR MOVING OBJECTS BASED ON A BUOYANCY FORCE

(76) Inventor: Sergey Nikolayevich Ermilov, Moscow (RU)

( * ) Notice: Subject to any disclaimer, the term of this patent is extended or adjusted under 35 U.S.C. 154(b) by 633 days.

(21) Appl. No.: 13/300,492

(22) Filed: Nov. 18, 2011

(65) Prior Publication Data
US 2013/0129427 A1    May 23, 2013

(51) Int. Cl.
  *B65G 51/00*  (2006.01)
  *F03D 5/00*   (2006.01)
  *B64B 1/50*   (2006.01)

(52) U.S. Cl.
  CPC ... *F03D 5/00* (2013.01); *B64B 1/50* (2013.01); *Y02E 10/70* (2013.01)

(58) Field of Classification Search
  USPC ......... 406/51, 191, 198; 290/55; 415/1, 4.1, 7
  See application file for complete search history.

(56) References Cited

U.S. PATENT DOCUMENTS

| | | | |
|---|---|---|---|
| 3,670,658 A | 6/1972 | Stelling | |
| 2008/0257396 A1 | 10/2008 | Chan et al. | |
| 2010/0133840 A1* | 6/2010 | Kim | 290/52 |
| 2010/0314886 A1* | 12/2010 | Potter | 290/55 |
| 2011/0057453 A1* | 3/2011 | Roberts | 290/55 |
| 2011/0101692 A1* | 5/2011 | Bilaniuk | 290/44 |
| 2011/0187118 A1* | 8/2011 | Lloyd | 290/55 |
| 2011/0266802 A1* | 11/2011 | Rehman Alvi | 290/52 |
| 2011/0267241 A1* | 11/2011 | Grimm et al. | 343/706 |
| 2012/0235410 A1* | 9/2012 | Serrano | 290/50 |
| 2013/0043687 A1* | 2/2013 | Tai et al. | 290/55 |
| 2013/0043688 A1* | 2/2013 | Tai et al. | 290/55 |
| 2013/0272846 A1* | 10/2013 | Inoue | 415/3.1 |
| 2013/0307274 A1* | 11/2013 | Sia | 290/55 |
| 2014/0044521 A1* | 2/2014 | Bae | 415/7 |
| 2014/0062094 A1* | 3/2014 | Chan | 290/55 |
| 2014/0077495 A1* | 3/2014 | Fagiano et al. | 290/44 |
| 2014/0147248 A1* | 5/2014 | Akimoto | 415/3.1 |

FOREIGN PATENT DOCUMENTS

| | | |
|---|---|---|
| EP | 1589221 A2 | 10/2005 |
| WO | WO 2004/036039 A1 | 4/2004 |

OTHER PUBLICATIONS

International Search Report and Written Opinion mailed Jul. 17, 2013, for International Application No. PCT/IB2012/002381, 18 pages.

Bolonkin, Alexander A., "A Cheap Inflatable High Altitude Gas Pipeline," The Open Petroleum Engineering Journal, 2009, vol. 2, Aug. 22, 2009, pp. 24-35.

* cited by examiner

*Primary Examiner* — Joseph Dillon, Jr.
(74) *Attorney, Agent, or Firm* — Blakely, Sokoloff, Taylor & Zafman LLP

(57) ABSTRACT

A pipe of an apparatus has a first gas in a first space and a second gas in a second space. The first gas is in the amount to generate a buoyancy force that exceeds at least a gravity force to position the apparatus in a stationary state at a predetermined distance relative to a reference surface. A fixture is coupled to the apparatus to secure the apparatus in the stationary state relative to the ground without supporting the apparatus. The first gas is lighter than the second gas. The pipe is capable of creating a flow of the second gas.

15 Claims, 10 Drawing Sheets

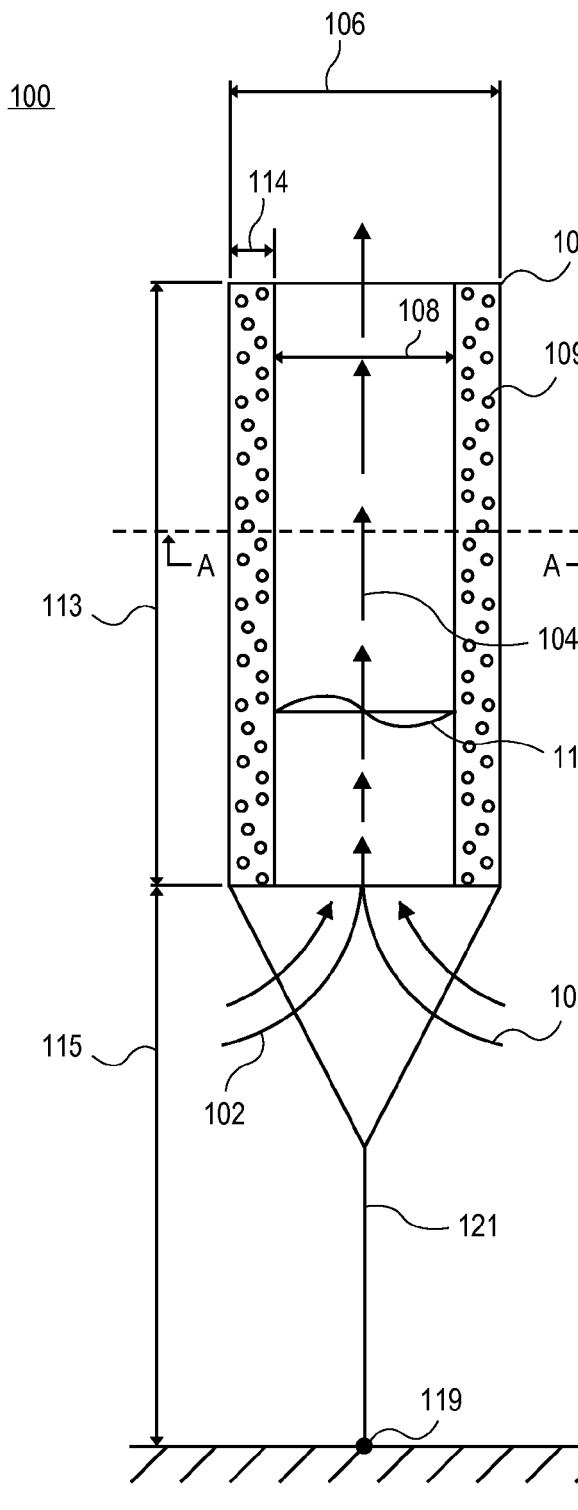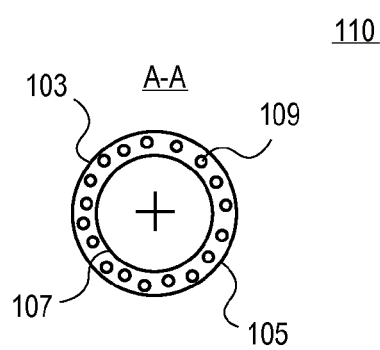
FIG. 1B
FIG. 1A

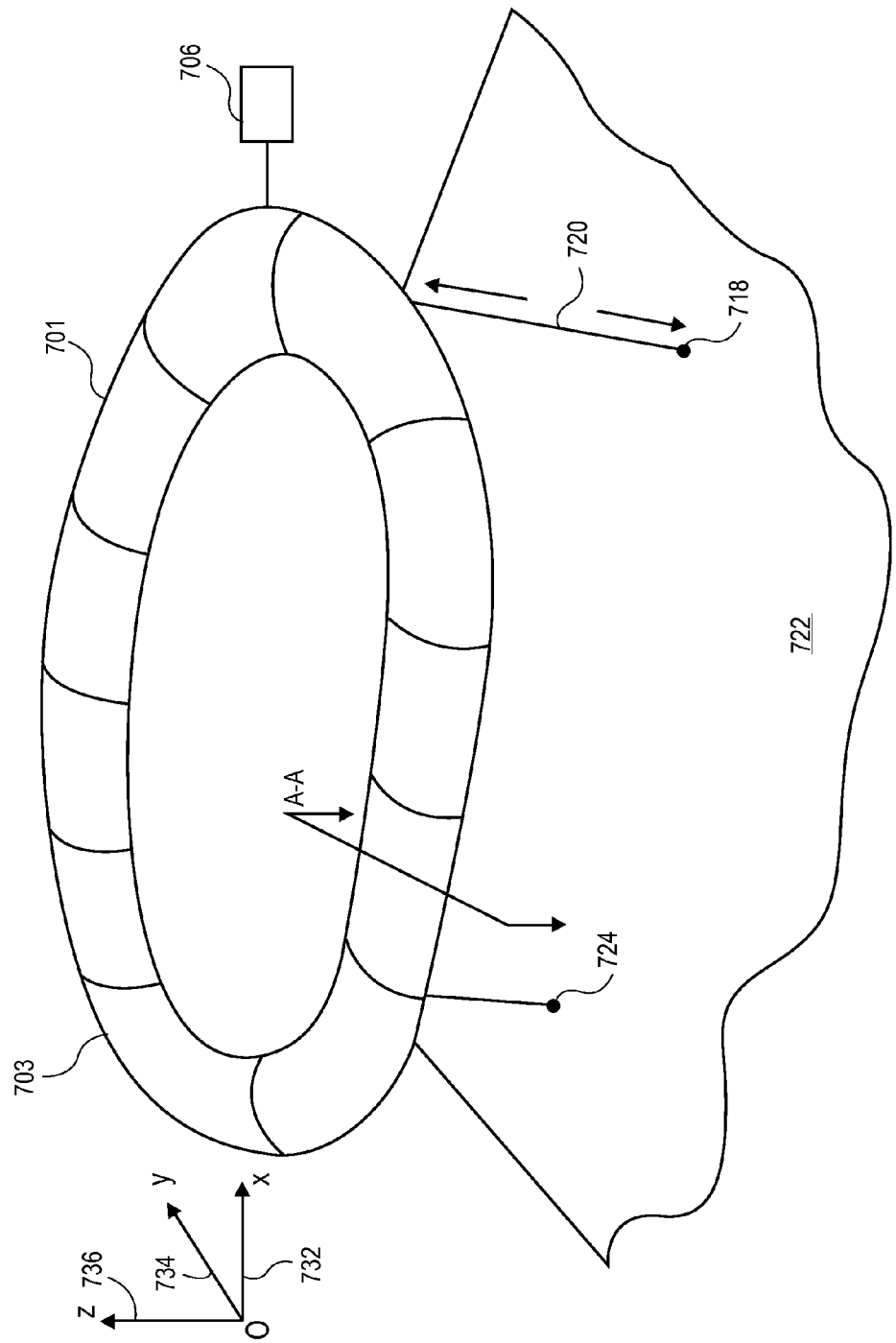
FIG. 7A1

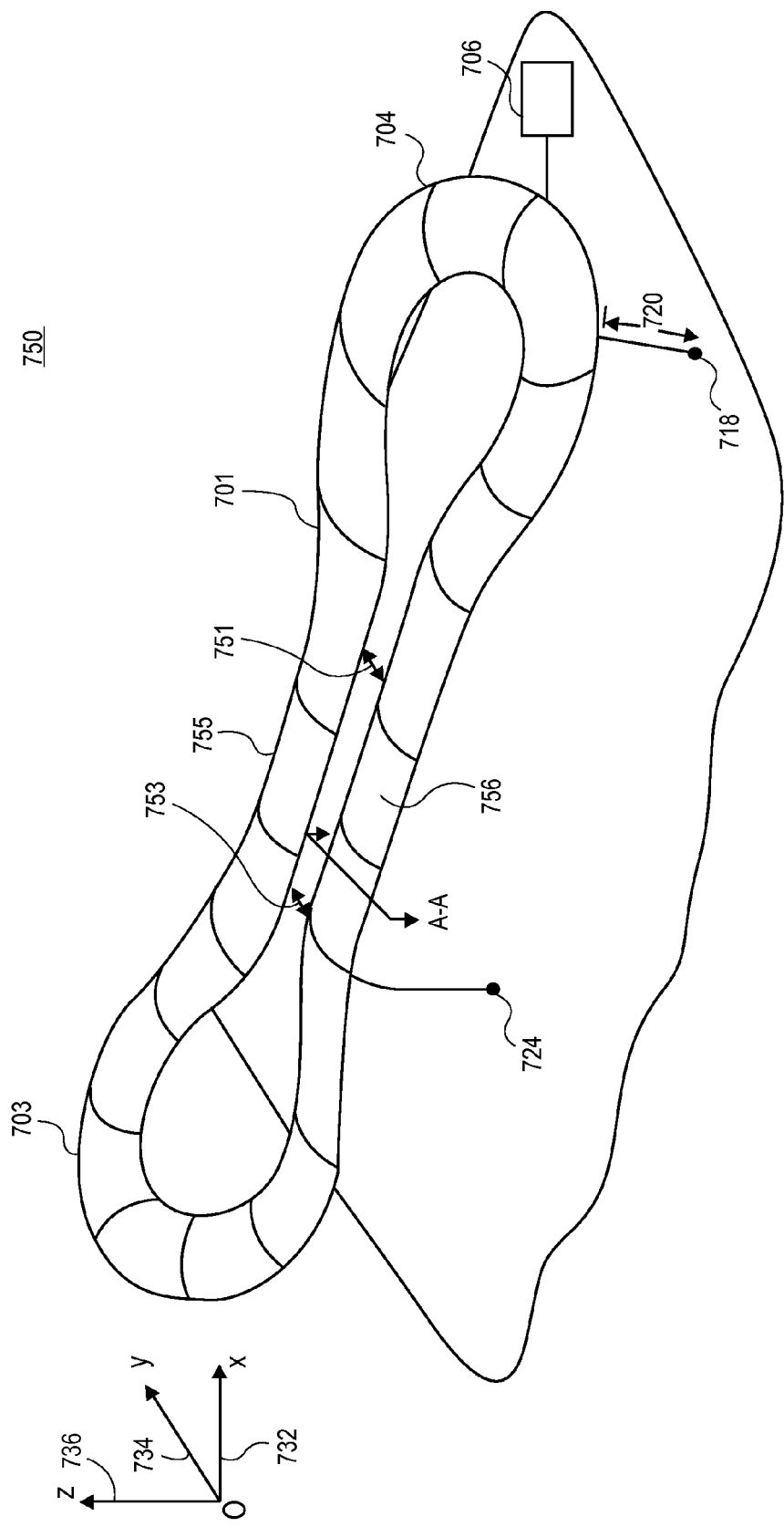

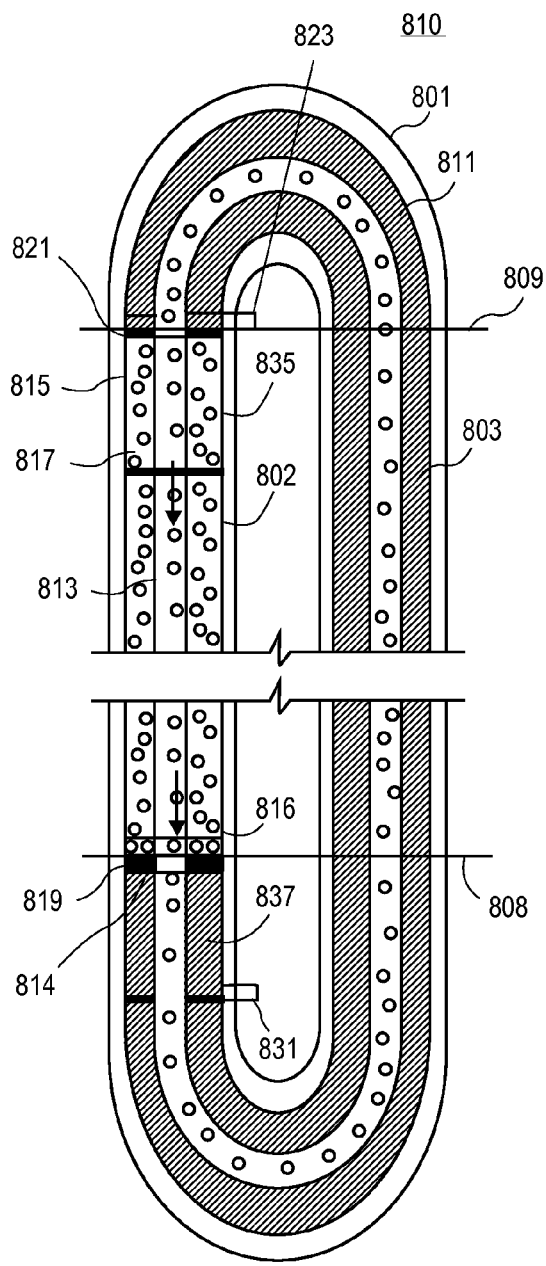
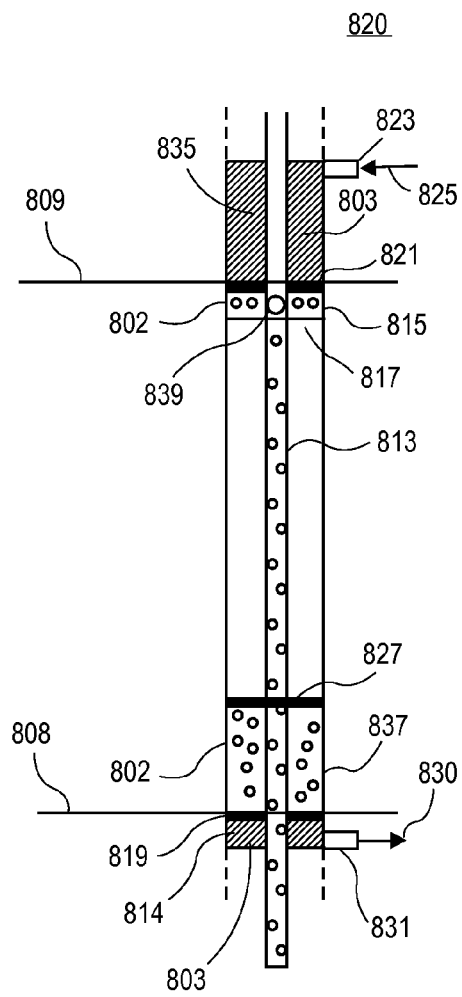
FIG. 8B
FIG. 8C

METHODS AND APPARATUSES FOR MOVING OBJECTS BASED ON A BUOYANCY FORCE

FIELD

At least some embodiments of the present invention relate generally to methods and apparatuses utilizing a buoyancy force, and more particularly to methods and apparatuses for moving objects based on a buoyancy force acting on volumes filled with a gas.

BACKGROUND

Generally, an aerostat refers to a system that remains aloft primarily using aerostatic buoyancy. Aerostats are known as flying machines. An example of an aerostat may be a large balloon filled with hot air or a buoyant gas (often hydrogen or helium). The earliest flights were made with hot air balloons using air heated with a flame, or hydrogen; later, helium was used. A balloon typically travels with the wind.

An aerostat's main structural component may be its envelope containing a lifting gas which is less dense than the surrounding atmosphere to provide buoyancy. An airship may refer to a type of aerostat or "lighter-than-air aircraft" that can be steered and propelled through the air using rudders and propellers or other thrust mechanisms. A typical airship carrying passengers, cargo, or both may move in the air from one location to another location. Currently, heavier than air structures having the length over 1,000 meters (m) may not be built due to certain structural limitations.

BRIEF DESCRIPTION OF DRAWINGS

The present invention is illustrated by way of example and not limitation in the figures of the accompanying drawings in which like references indicate similar elements.

FIG. 1A shows a cross-sectional view of an exemplary apparatus to create a flow of a gas without power consumption according to one embodiment of the invention.

FIG. 1B shows a cross-sectional view of a pipe along A-A line according to one embodiment of the invention.

FIG. 7A-1 shows a perspective view of an exemplary apparatus for transportation according to one embodiment of the invention.

FIG. 7A-2 shows a perspective view of an exemplary apparatus for transportation according to one embodiment of the invention.

FIG. 8B is a longitudinal section view of the apparatus as in FIG. 8A at a beginning of a moving cycle.

FIG. 8C is a cross-sectional view a portion of the apparatus as in FIG. 8B at an end of a moving cycle.

SUMMARY OF THE DESCRIPTION

Figure 2:
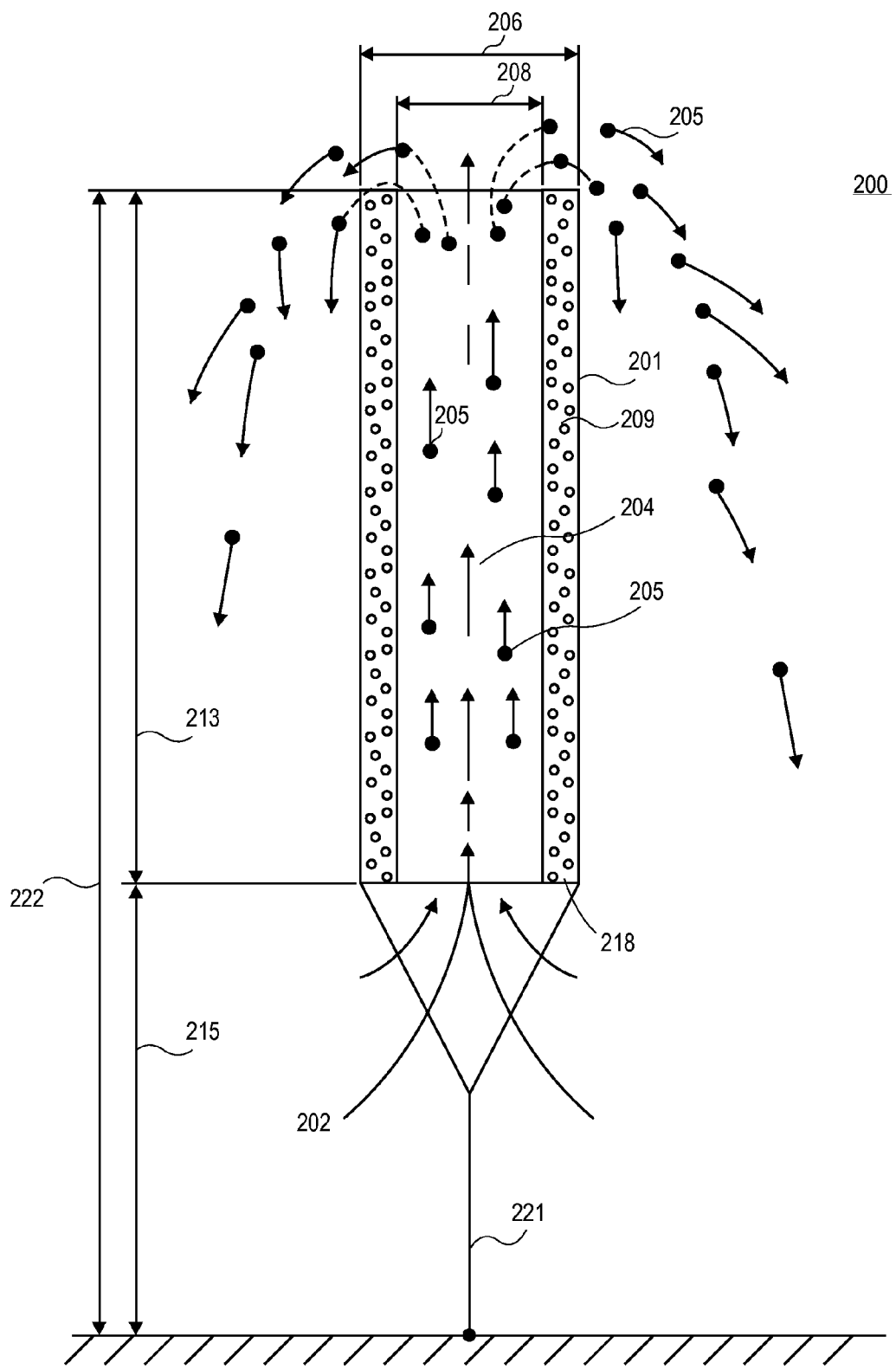
FIG. 2 shows a cross-sectional view of an exemplary apparatus to transport one or more objects according to one embodiment of the invention.

Exemplary embodiments of methods, apparatuses, and systems for moving objects based on a buoyancy force are described. In one embodiment, a pipe of an apparatus has a first gas in a first space and a second gas in a second space. The first gas is lighter than the second gas. The second gas can be, for example, air (e.g., oxygen), and the first gas can be, for example, helium, hydrogen, or any other gas that is lighter than air. The first gas is in an amount to generate a buoyancy force that exceeds at least a gravity force of the apparatus to position the apparatus in a stationary state at a distance relative to a ground. A fixture is coupled to a portion of the pipe to secure the apparatus in the stationary state relative to the ground without providing support for the apparatus. The first pipe capable of creating a flow of the second gas. An energy converter can be coupled to the pipe to convert an energy associated with at least the second gas to some other energy. In one embodiment, the pipe is buoyed up in the air and does not build up pressure of its own weight on the fixing points.

In one embodiment, an apparatus to provide transportation has at least a portion of a first pipe within a second pipe. The first pipe has a first gas in a first space and a second gas in a second space. The first gas is in the amount to generate a buoyancy force that exceeds at least a gravity force of the apparatus to position the apparatus in a stationary state at a distance relative a ground. The first pipe is maintained at a clearance distance from the second pipe. A fixture is coupled to the second pipe to secure the apparatus in the stationary state relative to the ground without supporting the apparatus. The first pipe is movable relative to the second pipe. A driver can be coupled to move the first pipe relative to the second pipe.

In one embodiment, a first gas is filled into a first space of a pipe of an apparatus to generate a buoyancy force that exceeds at least a gravity force associated with the apparatus to position the apparatus in a stationary state at a first distance relative to a ground. The first pipe can have a second gas in a second space. The first gas is lighter than the second gas. The apparatus is secured at the first distance relative to the ground without a support. A flow of the second gas is created within the first pipe based at least in part on the securing. An energy associated with the flow can be converted into some other energy.

In one embodiment, a first gas is filled into a first space of a first pipe of an apparatus to generate a buoyancy force that exceeds at least a gravity force associated with the apparatus to position the apparatus in a stationary state at a first distance relative to a ground. The first pipe has a second gas in a second space. The first gas is lighter than the second gas. The apparatus is secured in the stationary state at the first distance relative to the ground without being supported by a fixture.

The first pipe is moved based at least in part on the buoyancy force. An energy associated with moving can be converted to some other energy.

Other features of the present invention will be apparent from the accompanying drawings and from the detailed description that follows below.

DETAILED DESCRIPTION

Exemplary embodiments of methods, apparatuses, and systems based on a buoyancy force are described herein. The embodiments of the invention will be described with references to numerous details set forth below, and the accompanying drawings will illustrate the embodiments of the invention. The following description and drawings are illustrative of the embodiments of the invention and are not to be construed as limiting the invention. Numerous specific details are described to provide a thorough understanding of the present invention. However, in certain instances, well known or conventional details are not described in order to not unnecessarily obscure the present invention in detail.

Reference throughout the specification to "at least some embodiments", "another embodiment", or "an embodiment" means that a particular feature, structure, or characteristic described in connection with the embodiment is included in at least some embodiments of the present invention. Thus, the appearance of the phrases "in at least some embodiments" or "in an embodiment" in various places throughout the specification are not necessarily all referring to the same embodiment. Furthermore, the particular features, structures, or characteristics may be combined in any suitable manner in one or more embodiments.

One or more structures utilizing a buoyancy force acting in an air environment on volumes filled with lighter-than-air gas are described. In one embodiment, an exemplary structure having a predetermined shape is configured to create an air flow without power consumption. The kinetic energy of the air flow created in the shape of the structure can be used, for example, to generate electric power, to transport objects such as liquids, gases, and solids in different phases. In one embodiment, objects, for example, liquids, gases, and solids are transported horizontally using, for example, a gravity force, an engine, or both along an exemplary structure that remains static without any support on a ground surface. In one embodiment, extended objects (e.g., wires, pipelines, and the like) are attached to an exemplary structure that remains in a stationary state without any support on the ground surface. An exemplary structure that remains in a stationary state without any support on a ground surface to transport objects, for example, people, cargo, or both, can be positioned for example, in the air, under the ground or under the water. In one embodiment, an exemplary structure is provided to transform a buoyancy force into a kinetic energy of rotational movement. Depending on the purpose, the apparatus can be fixed by wire ropes in a vertical or a horizontal position (parallel or at a selected angle to a ground surface).

FIG. 1A shows a cross-sectional view 100 of an exemplary apparatus to create a flow of a gas without power consumption according to one embodiment of the invention. As shown in FIG. 1, an apparatus comprises a pipe 101. As shown in FIG. 1A, pipe 101 has a tubular shape. Pipe 101 has an opening 112 at a lower end and an opening 116 at a higher end. Pipe 101 has an outer diameter 106 and an inner diameter 116.

FIG. 1B shows a cross-sectional view of a pipe 101 along A-A line according to one embodiment of the invention. As shown in FIG. 1B, gas 109 fills a space between an outer wall having an outer diameter 105 and an inner wall having an inner diameter 107.

Referring back to FIG. 1A, a length 113 of the pipe 101 is substantially greater than outer diameter 106. In one embodiment, the length of the pipe is at least 1,000 meters. A gas 109 fills a space 118 between an inner wall and an outer wall of the pipe 101, and a gas 102 fills a space 104 within the inner wall. As shown in FIG. 1A, an inner wall and an outer wall are connected at each of the ends of the pipe 101 to form a seal to keep gas 109 within space 118. In one embodiment, a distance 114 between the inner wall and outer wall of the pipe is from about 1 meter to about 5 meters. In one embodiment, a distance 114 between the inner wall and outer wall of the pipe is about 1 meter. In one embodiment, gas 109 is lighter than gas 102. In one embodiment, gas 102 is air, and gas 109 is helium, hydrogen, or any other lighter than air gas.

Gas 109 fills space 118 in the amount to generate a buoyancy force that exceeds at least a gravity force of the apparatus. The buoyancy force created by gas 109 is used to position the apparatus in a stationary state at a distance 115 relative to a reference surface 117 (the reference surface can be, e.g., a ground, a water surface, and any other reference surface. A fixture 121, for example, a rope, a wire, a cable, and the like, is connected to a lower portion of the pipe 101 to secure the pipe 101 at a distance 115 relative to a location 119 on ground 117 without providing any support for the pipe 101. Distance 115 can be for example, from about 1 m to at least about 20 m.

As described above, gas 109 is filled into space 118 of the pipe to generate a buoyancy force that exceeds at least a gravity force associated with the apparatus to position the apparatus in a stationary state at a distance 115 relative to a ground 117. The apparatus is secured in the stationary state at a distance 115 relative to the ground without providing a support for the apparatus. A flow of the gas 102 within the pipe is created based at least in part on securing of the apparatus in the stationary state at a distance relative to the ground.

In one embodiment, gas 102 flowing in space 104 has a pressure that is lower than a pressure of the gas 109. In one embodiment, a pressure of the gas 102 in space 104 has a pressure that is equal to a pressure of gas 109. As shown in FIG. 1, gas 102 flows from lower end 112 to higher end 116. In one embodiment, the flow of the gas 102 has a speed of at least 20 meters per second ("m/sec"). In one embodiment, an energy converter 111 is inserted into pipe 101 to convert a kinetic energy of a flow of gas 102 to some other energy. In one embodiment, an energy converter 111 inside pipe 101 is placed on the reference surface (not shown). An energy converter 111 can include, for example, one or more wind generators (e.g., fans or propellers), mechanical devices transforming progressive motion into rotational motion when the mechanical devices are moved inside the pipe by a kinetic energy of the airflow; magnetic systems transforming progressive motion of the objects (they act as a rotor in a generator) inside the apparatus, carried out due to the kinetic energy of the airflow, and other devices to transform kinetic energy of the flow into some other energy. A kinetic energy of the flow of the gas can be used to generate electric power, to transport objects such as liquids, gases, solids in different phases, or a combination thereof, as described in further detail below.

In one embodiment, the pipe has a space between the inner wall and the outer wall filled with lighter than air gas (e.g., helium, hydrogen, hot air, and any other lighter than air gas). An air flows in a direction from a lower end of the pipe towards a higher end of the pipe. In one embodiment, the length of the pipe is not limited and depends on the purpose. In one embodiment, the inner and outer pipe walls are made of a light material, for example, metalized lavsan, metalized nylon fabric, and a combination thereof. In one embodiment, the space between the inner and outer walls of the pipe are filled with lighter than air gas (e.g., helium, hydrogen, hot air, and any other lighter than air gas) in the amounts required to create a buoyancy force exceeding the gravity force of the apparatus and the useful cargo inside the apparatus, cargo attached to the apparatus from outside, or both. The apparatus hangs up in the air over the ground due to the lifting force of gas in the space between the inner and outer walls of the pipe.

The apparatus having a shape of a pipe fixed vertically to the ground as described herein employs a difference between a temperature $T_1$ at the lower end of the pipe (e.g., at a ground level), such as at opening 112 and a temperature $T_2$ at the upper end of the pipe (e.g., in the upper atmosphere), such as at opening 116 to create natural continuous air flow. In one embodiment, the temperature $T_1$ at the lower end of the pipe is higher than the temperature $T_2$ at the upper end of the pipe. In one embodiment, an air flow having a speed of at least 20 m/sec is created within the inner walls of the pipe to move warmer air at a lower end of the pipe towards an upper end of the pipe where the air is colder.

A kinetic energy of the air flow inside the apparatus can be transformed into an electric power by a wind generator or any other similar device placed inside or outside the apparatus. As set forth above, an exemplary apparatus having a shape of a pipe positioned vertically over a ground is capable of creating a flow of air inside the apparatus. A kinetic energy of an upstream flow of warm air mass (e.g., at a lower end of the apparatus) towards the colder air mass (at an upper end of the apparatus) can be transformed to e.g., an electrical energy, a mechanical energy, a potential energy, and any other energy. For example, one or more devices can be placed inside the apparatus (the devices do not necessarily need to be fixed to the apparatus) that use a kinetic energy of the airflow to generate an electric power, or to lift liquids, solids and gases (heavier-than-air) to the specified height, as described in further detail below.

A buoyancy force created by lighter than air gas filling a space between the walls of the pipe is used to hold the apparatus statically in a predetermined position. The apparatus, such as shown in FIGS. 1A-2 is static (immovable) relative to the surrounding air environment. In one embodiment, the apparatus, such as shown in FIGS. 1A-2 employs the physical phenomenon related to natural temperature decrease with altitude by 6.5° C. every 1,000 meters, or the difference between the temperature of the industrial waste discharged into the atmosphere (for example, from about +50° C. to at least about +200° C.), and the temperature of the air at the altitude of 500 meters (for example, about +40° C.), can be at least 10° C. In one embodiment, the length of the pipe, such as length 113 is from about 1,000 meters ("m") to about 5,000 m, the inner diameter of the pipe, such as diameter 107 is from about 15 m to about 25 m, and the outer diameter of the pipe, such as diameter 105, is from about 16 m to about 30 m.

In one embodiment, the length of the pipe, such as length 113 is about 2,000 m, the inner diameter of the pipe, such as diameter 107 is about 18 m, and the outer diameter of the pipe, such as diameter 105, is about 20 m. In one embodiment, a volume of gas inside the apparatus, such as apparatus shown in FIGS. 1A and 2 is about 120,000 $m^3$. This volume is commeasurable to the volume of gas in the airships used for commercial purposes in 1930-40s in Europe. In one embodiment, if the length of the pipe is about 2,000 m and the temperature at a lower end of the pipe is about +15° C., the difference between temperature $T_1$ at the bottom of the pipe and temperature $T_2$ at the top of the pipe is about 12° C. that provides the speed of the airflow inside the apparatus of about 20 m/SEC. Typically, a working wind speed range utilized by wind generators is from about 5 m/sec to about 20 m/sec. An electric power generated by a wind generator can be about 1.2 MW. That amounts to 10 W of a generated power per 1 $m^3$ of lighter than air gas that fills the pipe, as described above.

FIG. 2 shows a cross-sectional view 200 of an exemplary apparatus to transport one or more objects according to one embodiment of the invention. As shown in FIG. 2, an apparatus comprises a pipe 201. Pipe 201 has a tubular shape. Pipe 201 has an outer diameter 206 and an inner diameter 208. A length 213 of the pipe 201 is substantially greater than outer diameter 206. In one embodiment, the length of the pipe is at least 1,000 meters. As shown in FIG. 2, a gas 209 fills a space 218 between an inner wall and an outer wall of the pipe 201, and a gas 202 fills a space within the inner wall, as described above with respect to FIGS. 1A and 1B. As shown in FIG. 2, an inner wall and an outer wall are connected at each of the ends of the pipe 201 to form a seal to keep gas 209 between the walls.

Gas 209 fills the space between the inner and outer walls of the pipe 201 in the amount necessary to generate a buoyancy force that exceeds at least a gravity force of the apparatus, as described above. The buoyancy force created by gas 209 is used to position the apparatus in a stationary state at a distance 215 relative to a ground. A fixture 221, for example, a rope, a wire, a cable, and the like, is connected to a lower portion of the pipe 201 to secure the pipe 201 at a distance 215 relative to a location on the ground without providing any support for the pipe, as described above.

In one embodiment, gas 202 flowing in a space within inner diameter 208 of the pipe has a pressure that is lower than a pressure of the gas 209. In one embodiment, gas 202 flowing in a space within inner diameter 208 of the pipe has a pressure that is equal to a pressure of the gas 209. As shown in FIG. 2, gas 202 flows within inner diameter 208 from a lower end opening of the pipe to a higher end opening of the pipe. In one embodiment, the flow of the gas 201 has a speed of at least 20 meters per second ("m/sec"). As shown in FIG. 2, the flow of the gas 202 lifts one or more dispersed objects, such as objects 205. One or more objects can be, for example, liquids, gases, solid particles, or a combination thereof. As shown in FIG. 2, pipe 202 is configured for transportation of objects, such as objects 205 over a predetermined distance, for example, from a lower end of the pipe 201 to at least the upper end of the pipe 201 while remaining in the stationary state. In one embodiment, a kinetic energy of the air flow 204 created within inner diameter 208 of the pipe 201 is used to lift heavier-than-air gases, liquids, solid particles in their natural and dispersed state, various heavier-than-air objects at a specified height, or for other purposes associated with usage of the kinetic energy of the air flow inside the apparatus. In one embodiment, the apparatus, for example, as shown in FIGS. 1A-1B, and 2 is used to transformation of industrial household waste heat into an electric power. Due to the buoyancy force of lighter than air gas filling the space between the inner and outer walls of the pipe, the apparatus hangs up in the air over the ground and does not exert any pressure upon the objects under it. This quality of the apparatus allows installing it unsupported over/ near industrial pipes or other sources ejecting industrial/ household waste gas/air into the atmosphere. In one embodiment, the apparatus as described in FIGS. 1A-1B, and 2 is installed vertically in such a way so that gas/warm air from the ejecting source enters the lower end of the pipe. Due to a difference between a temperature of the gas, such as gas 202, entering the apparatus at the lower opening of the pipe 202 and the air at the upper portions of the pipe, an air flow is created inside the inner diameter 208. A kinetic energy of the air flow inside the apparatus can be transformed into an electric power by a wind generator or other devices attached to the apparatus from inside or outside. In one embodiment, an industrial/household waste gas/air additionally fills the space between the inner and outer walls of the pipe to create an extra buoyancy force to maintain the balanced position of the apparatus in the air.

In one embodiment, drops of liquid, solid particles, or both in dispersed state are lifted by the air flow to provide a spraying/atomizing system. That is, the apparatus, as shown in FIG. 2 can be used to spray liquids, gases, solid particles lifted at the specified height by the flow of gas, such as gas 202, for the purposes of watering, fertilizing, plant protection, pest management, and other purposes which require spraying liquids, gases, and solid particles over large areas.

The apparatus fixed vertically creates an air flow inside itself. As shown in FIG. 2, a kinetic energy of an air flow 204 lifts the dispersed objects, e.g., drops of liquid, solid particles, or both from the bottom portion of the apparatus up to the height 222 that is about a sum of the length of the pipe, such as length 213 and the distance of the pipe from the ground, such as distance 215. In one embodiment, a tank (not shown) is attached to a top portion of the pipe 201 to collect the dispersed objects lifted by the flow of gas 202 (e.g., air). A potential energy of the dispersed objects lifted by the apparatus as shown in FIG. 2 can be used to perform a useful work. In case the apparatus as shown in FIG. 2 lifts dispersed water/solid particles into the atmosphere, the water condenses and precipitates to create an artificial rain. Solid particles thrown from the apparatus into the atmosphere can be sprayed over a ground surface.

When the apparatus having the dimensions as set forth above with respect to FIGS. 1A, 1B, and 2 is used for utilization of the waste heat having the temperature from about +55° C. to at least about +200° C., the airflow speed inside the apparatus amounts to about 40 m/sec. Generally, a maximum allowable speed of the air flow to operate typical wind generators is about 40 m/sec. An electric power generated by the wind generator based on 40 m/sec speed can reach 10 Megawatt ("MW"). That amounts to about 84 W of generated power for 1 m$^3$ of the gas (e.g., a lighter than air gas) that fills up the apparatus to create a buoyancy force. In one embodiment, the structure of the apparatus does not place any limitations on its length. In one embodiment, the length of the pipe, such as length 113 and length 213 that determines the height of the apparatus does not exceed 5,000 m. At the height of 5,000 m the temperature of the air is about minus 17° C. If the height of the pipe is about 5,000 m, a difference between a ground temperature and the temperature at the top of the pipe in summer time is about 45-50° C. Such difference in the temperatures can increase the speed of the airflow in the pipe beyond 20 m/sec.

Figure 3:
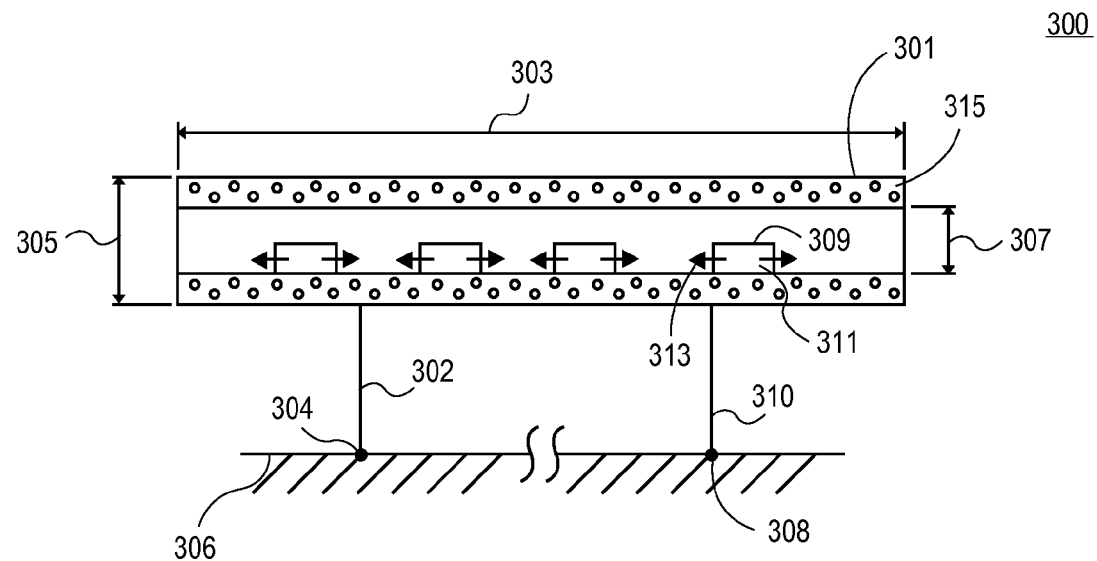
FIG. 3 is a longitudinal section view of an exemplary apparatus for transportation according to one embodiment of the invention.

FIG. 3 is a longitudinal section view 300 of an exemplary apparatus for transportation according to one embodiment of the invention. As shown in FIG. 3, pipe 301 has a tubular shape. Pipe 301 has an opening at a one end and an opening at another end. The openings are defined by an inner diameter 307 of the pipe 301. Pipe 301 has an outer diameter 305. A gas 315 fills a space between an outer wall having an outer diameter 305 and an inner wall having an inner diameter 307. As shown in FIG. 3, an inner wall and an outer wall are connected at each of the ends of the pipe 301 to form a seal to keep gas 315 within the space between the inner and outer walls. As shown in FIG. 3, a length 303 of the pipe 301 is substantially greater than outer diameter 305. In one embodiment, the length of the pipe is at least 1,000 meters. In one embodiment, a distance between the inner wall and outer wall of the pipe 301 is from about 1 meter to about 5 meters. In one embodiment, a distance between the inner wall and outer wall of the pipe is about 2 meters. In one embodiment, gas 315 is helium, hydrogen, hot air, or any other lighter than air gas.

Gas 315 fills the space between the inner and outer walls of the pipe in the amount that is necessary to generate a buoyancy force that exceeds at least a gravity force of the apparatus. The buoyancy force created by gas 315 is used to position the apparatus in a stationary state at a predetermined distance relative to a ground 306. A fixture 302 is coupled to one portion of the pipe 301 to secure the apparatus in the stationary state at a predetermined distance relative to a location 304 on the ground 306 without providing any support for the apparatus including pipe 301.

A fixture 310 is coupled to another portion of the pipe 301 to secure the pipe 301 at a predetermined distance relative to a location 308 on the ground 306 without providing any support for the apparatus including pipe 301. Fixtures 304 and 310 can be, for example, ropes, wires, cables, and the like. The apparatus placed horizontally to the ground, such as depicted in FIG. 3 can be used for transporting one or more objects 309, e.g., cargo, people, or both along the length of the pipe 301 that is in a stationary state by using an engine without any support on the ground surface, and without transferring its load onto the ground. In one embodiment, the pipe can have an extremely long or unlimited length. The inner and outer walls of the pipe are made of a light material, for example, metalized lavsan, metalized nylon fabric, and a combination thereof. The space between the inner and outer walls of the pipe can be filled with a lighter-than-air gas (e.g., helium, hydrogen, and the like). Gas in the space between the inner and outer walls of the pipe creates a buoyancy force exceeding the gravity force of the pipe and the gravity force of a useful load (e.g., cargo, people, and other objects) inside it.

In one embodiment, objects, such as an object 309 are moved in the air horizontally along the length the pipe 301 for distances from about 500 m to about several thousand kilometers. As shown in FIG. 3, pipe 301 is in a stationary state relative to the surrounding air environment, and is fixed in the air without any support on the ground. Currently, horizontal structures that are capable of covering distances over 2 km between two bridge bearings without support on the ground do not exist. In one embodiment, an inner diameter of the pipe, such as diameter 307 is from about 1 m to about 5 m, and an outer diameter of the pipe, such as diameter 305 is from about 2 m to about 15 m. In one embodiment, an inner diameter of the pipe, such as diameter 307 is about 2 m, and an outer diameter of the pipe, such as diameter 305 is about 10 m. In one embodiment, one or more objects, such as object 309 has a weight of about 20 kilograms ("kg") per one running meter of the length of the pipe, such as pipe 301. In one embodiment, the length of the pipe, such as length 303 can be extremely long or unlimited and depends on the specific situation. In one embodiment, the length of the pipe, such as length 303 is from about 100 m to about several thousand kilometers. In one embodiment, the outer and inner diameters of the pipe vary depending on a specific task.

Figure 4:
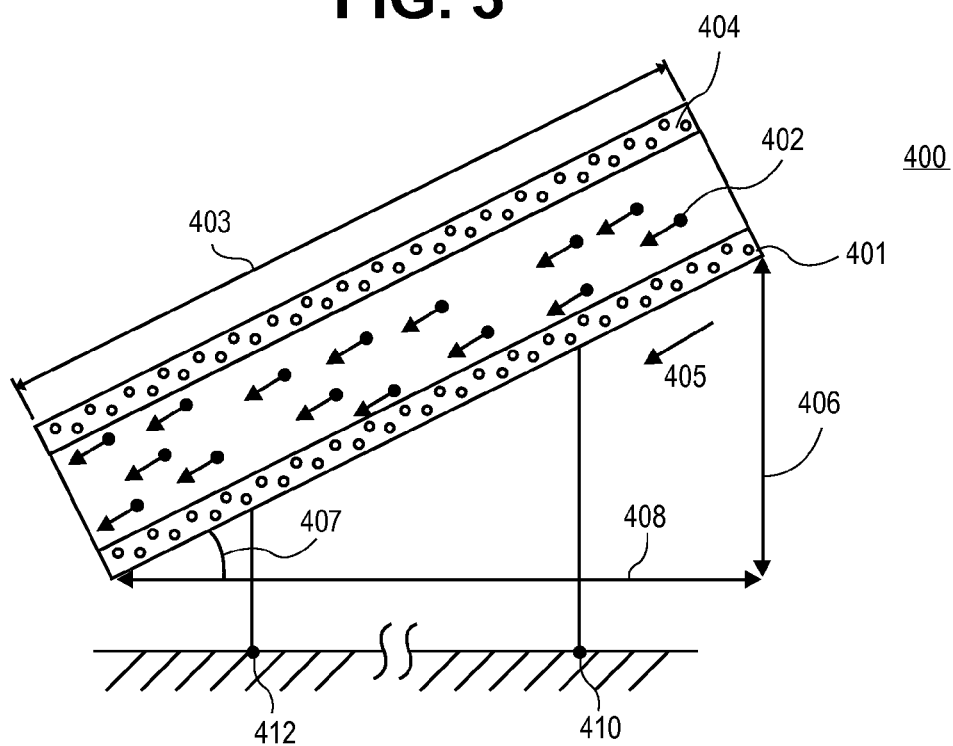
FIG. 4 is a longitudinal section view of an exemplary apparatus for transportation according to another embodiment of the invention.

FIG. 4 is a longitudinal section view 400 of an exemplary apparatus for transportation according to another embodiment of the invention. As shown in FIG. 4, pipe 401 has a tubular shape. Pipe 401 has an opening at a one end and an opening at another end. The openings at each of the ends of the pipe are defined by an inner diameter of the pipe, as described above. A gas 404 fills a space between an outer wall and an inner wall that are connected at each of the ends of the pipe 401 to form a seal to keep the gas 404, as shown in FIG.

4. A length 403 of the pipe 401 is substantially greater than the outer diameter of the pipe, as described above. Gas 404 fills the space between the inner and outer walls of the pipe in the amount that is necessary to generate a buoyancy force that exceeds at least a gravity force of the apparatus. The buoyancy force created by gas 404 is used to position the apparatus in a stationary state at a predetermined distance relative to a ground, as described above.

As shown in FIG. 4, a first fixture is coupled to a portion of the pipe 401 to secure the apparatus in the stationary state at a distance 409 relative to a location 412 on the ground without providing any support for the apparatus. A second fixture is coupled to a portion of the pipe 401 to secure the pipe 401 at a distance 411 relative to a location 410 on the ground without providing any support for the apparatus. The examples of the fixtures and pipes are described above. As shown in FIG. 4, a long pipe 401 has the space between inner and outer walls filled with a lighter-than-air gas 404 (e.g., helium, hydrogen, hot air, and the like). Gas 404 inside the pipe creates a lifting force exceeding the gravity force of the pipe, objects that can be attached to the pipe, and systems for transporting liquids, gases, and objects.

As shown in FIG. 4, pipe 401 is fixed to the ground surface by wire ropes at an angle 407 to the ground surface to create a tilt for the pipe. The tilt of the pipe ensures flow of liquids or movement of objects, such as an object 402 over selected distances inside the pipe or by the systems fixed to the pipe from outside due to the tilt and gravity force. Objects, such as an object 402 placed inside the apparatus can move along the length of the pipe that remains in a stationary state at an angle relative to the ground. In one embodiment, objects, such as an object 402 (e.g., liquids, solid particles, cargo) can move over a distance defined by a length 403 of the pipe due to the tilt and a gravity force without transferring its load to the ground surface. The tilt angle, e.g., angle 407, can be from about 0.5 degrees (°) to at least about 2°.

Figure 5:
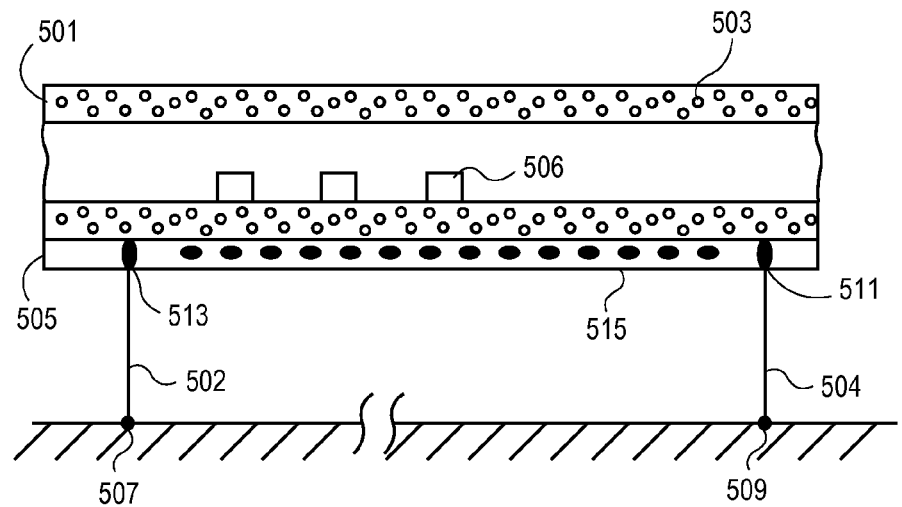
FIG. 5 is a longitudinal section view of an exemplary apparatus for transportation according to another embodiment of the invention.

FIG. 5 is a longitudinal section view 500 of an exemplary apparatus for transportation according to another embodiment of the invention. A pipe 501 can be one of the pipes as described above. As shown in FIG. 5, a gas 503 fills a space between an outer wall and an inner wall that are connected at each of the ends of the pipe 501 to form a seal to keep gas 503 within the space between the inner and outer walls, as described above. A fixture 502 and fixture 504 are coupled to the pipe 501 to maintain the pipe 501 in a horizontal position relative to the ground, as described above with respect to FIG. 3.

As shown in FIG. 5 one or more objects, such as an object 506 (e.g., cargo, people, or both) are transported along the length of the pipe 501 that is in a stationary state without any support on the ground surface, and without transferring its load onto the ground, as described above. In one embodiment, one or more objects, e.g., an object 515, can be attached by fixtures, e.g., fixtures 513 and 511 to the outer wall along the length of the pipe, as described above. In one embodiment, object 515 can be another pipe containing liquids, gases, solids, or a combination thereof that can be moved horizontally for example, by a gravity force, an engine, a pressure or a combination thereof without any support on the ground surface. In another example, object 515 can be one or more electrical cable lines, wires, pipelines, and the like. As shown in FIG. 5, objects extending over large distances (e.g., wires, cables, pipelines), can stay in the air attached to the pipe 501 without transferring their load to the ground surface. In another embodiment, one or more elongated objects 515 e.g., one or more electrical cable lines, wires, pipelines, and the like as described above, are attached to a cylinder filled with gas completely used to hang objects from outside.

Figure 6:
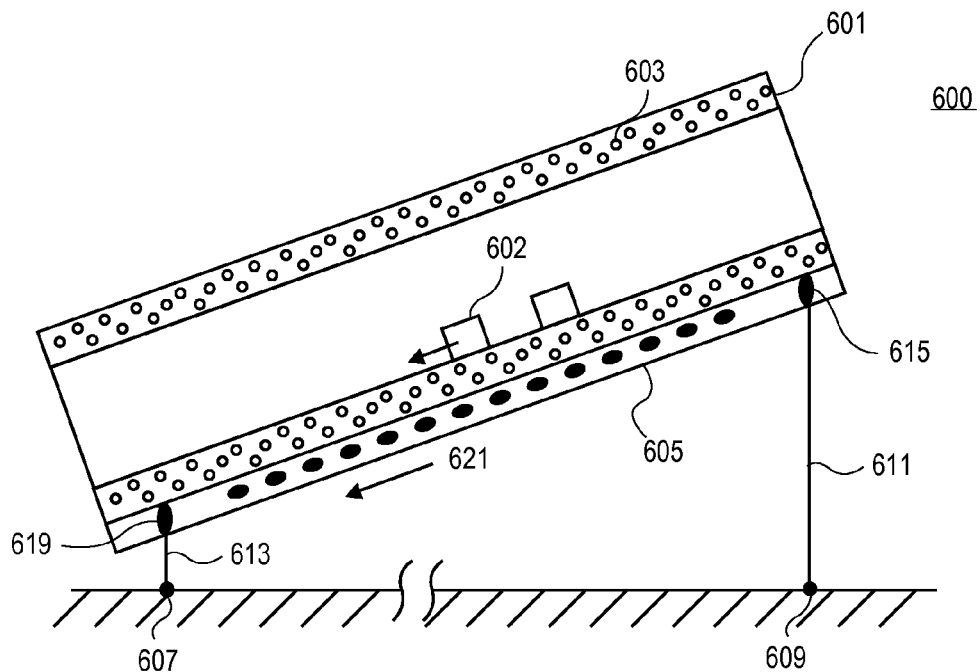
FIG. 6 is a longitudinal section view of an exemplary apparatus for transportation according to another embodiment of the invention.

FIG. 6 is a longitudinal section view 600 of an exemplary apparatus for transportation according to another embodiment of the invention. A pipe 601 can be one of the pipes as described above. As shown in FIG. 6, a gas 603 fills a space between an outer wall and an inner wall that are connected at each of the ends of the pipe 601 to form a seal to keep gas 603 within the space between the inner and outer walls, as described above. A fixture 613 and fixture 611 are coupled to maintain the pipe 601 at an angle relative to the ground to create a tilt, as described above with respect to FIG. 4. The tilt can be from about 0.5° to at least about 2°, as described above. Objects, such as an object 602 placed inside the apparatus can move along the length of the pipe that remains in a stationary state at an angle relative to the ground. In one embodiment, objects, such as an object 602 (e.g., liquids, solid particles, cargo) can move over a distance defined by the length of the pipe due to the tilt and a gravity force without transferring its load to the ground surface, as described above.

As shown in FIG. 6 one or more objects, e.g., a pipeline 605, can be attached by fixtures, e.g., fixtures 619 and 615 to the outer wall along the length of the pipe 601. Pipeline 605 can contain liquids, gases, solids, or a combination thereof that can be moved due to the tilt and a gravity force without transferring its load onto the ground. The apparatuses as depicted in FIGS. 4 and 6 can be installed, for example, at an angle to the horizontal with the slope of 1 m per every 1,000 m that allows to move liquid at the distances over 1,000 km employing the gravity force acting on it with no energy consumption. (For reference: the average drop of a lowland river is 0.1 m per 1,000 m.) Under these conditions, the upper end of the pipe as described in FIGS. 4 and 6 can be, for example at the height of 1,000 m and the lower end—on the ground.

Apparatuses as described with respect to FIGS. 4 and 6 can be used to move objects such as liquids, solids horizontally due to the slope over several thousand km with no support on the ground surface to provide a water supply, land improvement systems, and the like. Apparatuses as described with respect to FIGS. 4 and 6 can be used to install power lines, telecommunication lines, pipelines in the air with no support on the ground surface or to overcome water, mountain and other barriers in places where it is complicated or impossible to get support on the ground when installing them. Any of the apparatuses as described in FIGS. 3-6 can be used as a bridge or an overpass to transport useful cargo by means of mechanical devices moving by an engine inside or outside the apparatus over distances up to 5,000 m with no support on the ground surface. The weight of the transported cargo can amount to 20-50 kg per 1 running m of the length of the pipe. Any of the apparatuses as described in FIGS. 3-6 a bridge over 2,000 m long for pedestrians to walk between two points. Installation and usage of the apparatuses as described above have minimal impact on the environment. After the apparatus is removed no traces of its presence remain.

In one embodiment, the space in the pipe containing the gas that generates a buoyancy force, as described above, comprises one or more sections (e.g., separate segments). In one embodiment, the pipe as described in FIGS. 1-6 is made of separate segments. In one embodiment, each of the segments of the pipe has a length up to about 100 m, an inner diameter of about 18 m, and an outer diameter of about 20 m. Dimensions of the sections can be different depending on a task. The segments can be connected to each other and form an apparatus having the shape of a long pipe. The length of the pipe is determined by the number of the segments connected to each other. In order to compensate for the loss of a gas through the shell, each segment has a gas supply pipe to supply gas from an outside gas tank placed on the ground. The gas supply pipe has an opening into the segment's inner volume.

When the segments are connected to each other, gas supply pipes are also connected to each other and forming a whole gas supply pipe, which length is equal to the length of the apparatus. A gas to create a buoyancy force is supplied to the gas supply pipe in the lower segment and then is distributed among all segments of the apparatus. The segment structure of the pipe can be framed or frameless. A frame of the framed structure apparatus can be made of light materials for example, aluminum, carbon fiber reinforced plastic, and a combination thereof covered with gas impermeable shell giving the pipe its shape. The gas to create a buoyancy force (e.g., lighter than air gas) is placed inside the shell. In case of the frameless structure apparatus, gas impermeable shell in the shape of a pipe is filled with the gas to create a buoyancy force (e.g., a lighter than air gas), which pressure is higher than the atmospheric pressure. Frameless structure apparatuses can be up to 200 m long.

Figure 7B:
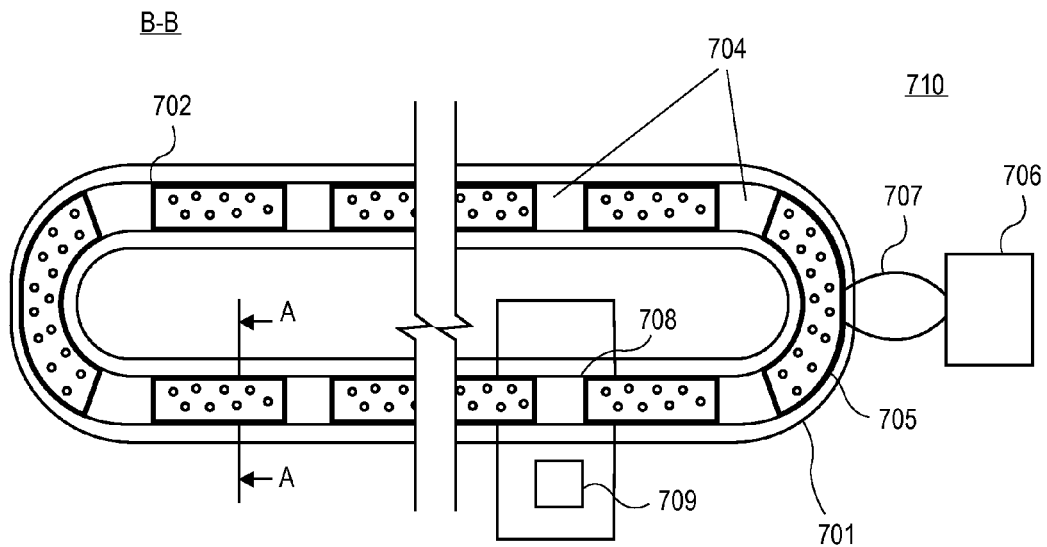
FIG. 7B is a longitudinal section view of an apparatus along a XOY plane defined by an OX axis and an OY axis according to one embodiment of the invention.
Figure 7C:
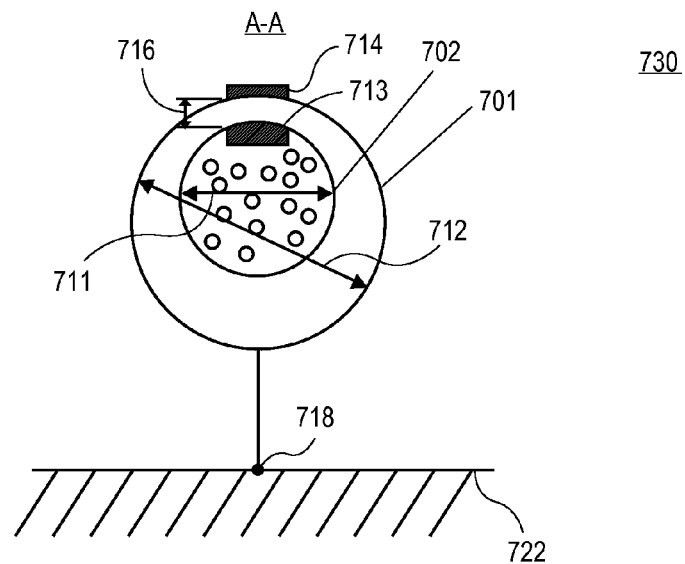
FIG. 7C shows a cross-sectional view of an apparatus as in FIGS. 7A and 7B along an A-A line according to one embodiment of the invention.

FIG. 7A-1 shows a perspective view 700 of an exemplary apparatus for transportation according to one embodiment of the invention. FIG. 7A-2 shows a perspective view 750 of an exemplary apparatus for transportation according to one embodiment of the invention. FIG. 7B is a longitudinal section view of an apparatus 700 along a XOY plane defined by an OX axis 732 and an OY axis 734 according to one embodiment of the invention. FIG. 7C shows a cross-sectional view of an apparatus as in FIGS. 7A-1,7A-2, and 7B along an A-A line according to one embodiment of the invention. An apparatus as depicted in FIGS. 7A-1, 7A-2, 7B and 7C can be used to transport people, cargo, or both over different distances horizontally and vertically in various environments, for example, in the air with or without transferring a load to a ground surface, under the ground, and under the water. In one embodiment, a pipe 701 has a shape of a closed loop (e.g., ring) comprising curved portions. As shown in FIGS. 7A-1 and 7A-2, the curved portions, such as portions 703 and 704, have a radius of curvature. In one embodiment, pipe 701 has linear portions, such as portions 755 and 756, as shown in FIG. 7A-2. Distances between the linear portions, such as a distance 751 and a distance 753 can vary from about zero to about any distance other than zero depending on a task. In one embodiment, curved portions of the pipe, such as portions 703 and 704 are used to turn and move objects into an opposite direction along the pipe.

An apparatus comprises an outer ring pipe 701 and an inner ring pipe 702, as shown in FIGS. 7B and 7C. At least a portion of the inner ring pipe 702 is within outer pipe 701. As shown in FIG. 7C, an outer ring pipe 701 has a size 712 that is greater than a size 711 of an inner ring pipe 702. The inner ring pipe has a space for a gas (e.g., helium, hydrogen, hot air, or any other gas that is lighter than air) in the amount to generate a buoyancy force that exceeds at least a gravity force of the apparatus to position the apparatus in a stationary state at a predetermined distance, e.g., a distance 720 relative a ground 722. In one embodiment, at least a portion of the inner ring pipe 702 is movable relative to the outer ring pipe 701. A fixture 718 is coupled to the outer ring pipe 701 to secure the apparatus in a stationary state at a predetermined distance relative to a location on the ground 722 without supporting the apparatus. A fixture 724 is coupled to the outer ring pipe 701 to secure the apparatus in a stationary state at a predetermined distance relative to a location on the ground 722 without supporting the apparatus.

As shown in FIGS. 7A and 7B a driver 706 can be coupled to the apparatus to move the inner ring pipe 702 relative to stationary outer ring pipe 701. Driver 706 can be an external engine/energy source that is coupled to a drive 707 that moves (e.g., rotates) inner ring pipe 702 relative to outer ring pipe 701.

In one embodiment, the inner ring pipe 702 comprises one or more working modules, such as a working module 705 containing a gas to create a buoyancy force, and one or more transport modules, such as transport modules 704 and a transport module 708 to transport objects, e.g., people, cargo, or both, as shown in FIG. 7B. Transportable cargo can include various objects, for example, liquids, gases, solids, or a combination thereof. In one embodiment, each of the outer ring pipe and inner ring pipe of the apparatus has a shape of an elongated ring, as shown in FIG. 7B.

As shown in FIG. 7B, outer ring pipe 701 has one or more exit points 717 for modules of the inner ring pipe 702, such as for module 708. The exit points 717 allow removing the modules from the apparatus. In one embodiment, removing the modules from the apparatus via exit points 717 and stopping the movement of the modules at a destination point is performed without stopping the movement of the apparatus. A new module (e.g., transport or working) can replace the one that is removed. The new module can be empty or with people/cargo inside.

Inner ring pipe 702 is at a clearance distance 716 from the outer ring pipe 701, as shown in FIG. 7C. A portion of a clearance maintaining system 714 is coupled to outer ring pipe 701, and a portion of a clearance maintaining system 713 is coupled to inner ring pipe 702, as shown in FIG. 7C. The clearance maintaining system can be a magnetic system, a mechanical system, or a magnetic/mechanical system ensuring a clearance between the outer and inner pipes.

In one embodiment, an apparatus based on a buoyancy force has two pipes in the form of elongated rings. The inner smaller diameter pipe is inserted into the outer bigger diameter pipe. Walls of the inner and outer pipes do not contact each other due to the lifting force of the lighter-than-air gases contained in the working modules of the inner pipe and magnetic/mechanical system for stabilizing the pipes relative to each other.

The inner smaller diameter pipe contains a long row of working and transport modules. The modules connected to each other to form the inner pipe. The working modules are filled with lighter-than-air gas (e.g., helium, hydrogen, hot air, and the like.) The transport modules are designed for transporting people/cargo. The transport modules for transporting people or objects are filled with air. The transport modules for transporting gases and liquids are filled with the transported gas or liquid.

Gas inside the working modules creates a lifting force exceeding the gravity force of the apparatus and people, cargo, or both placed within the transport modules. The lifting force created by gas inside the working modules allows the structure to hang in the air over the ground without any support. If the lifting force of gas inside the working modules is not enough to lift the apparatus into the air, extra tanks with lighter-than-air gas are attached to the apparatus from the outside to create an extra lifting force.

In one embodiment, to avoid contact between the walls of the inner and outer pipes, a magnetic/mechanical or other clearance maintaining system is attached to the upper portion of each of the inner and outer pipes to stabilize position of the pipes relative to each other. The clearance maintaining system together with the lifting force of gas within the working modules does not let the walls of the inner and outer pipes contact each other.

In one embodiment, the inner smaller diameter pipe is put in a continuous motion relative to the outer pipe by a driver system, e.g., an electric linear motor, an engine placed on the inner or outer pipe operating on an energy source located separately from the apparatus on the ground, an external engine drive or other system. In one embodiment, the apparatus is hung in the air and is held at a predetermined height over the ground by wire ropes, cables, or other fastening devices fixed to the stationary outer pipe and to the ground surface systems. If needed, the lifting force of gas in the working modules can be reduced in order to place the apparatus on the ground or on supporting piers.

The apparatus can also be placed under the ground or under the water. When the apparatus is placed underground, the lifting force of the gas inside the working modules is used to compensate the gravity force of the transport/working modules and transported people/cargo in order to ensure clearance between the walls of the inner and outer pipes.

When the apparatus is placed underwater, the lifting force of gas inside the working modules is used to compensate the gravity force of the transport/working modules and transported people/cargo in order to ensure clearance between the walls of inner and outer pipe, as well as to maintain the balanced position of the apparatus underwater.

When the inner pipe moves relative to the outer pipe, transport modules with people/cargo move over a prescribed distance. To transport gas, a transport module is filled with gas to be transported completely. To transport lighter-than-air gas, transport and working modules are filled with the gas to be transported. Along the outer pipe there are exit points for modules with people/cargo, as described above.

Figure 7D:
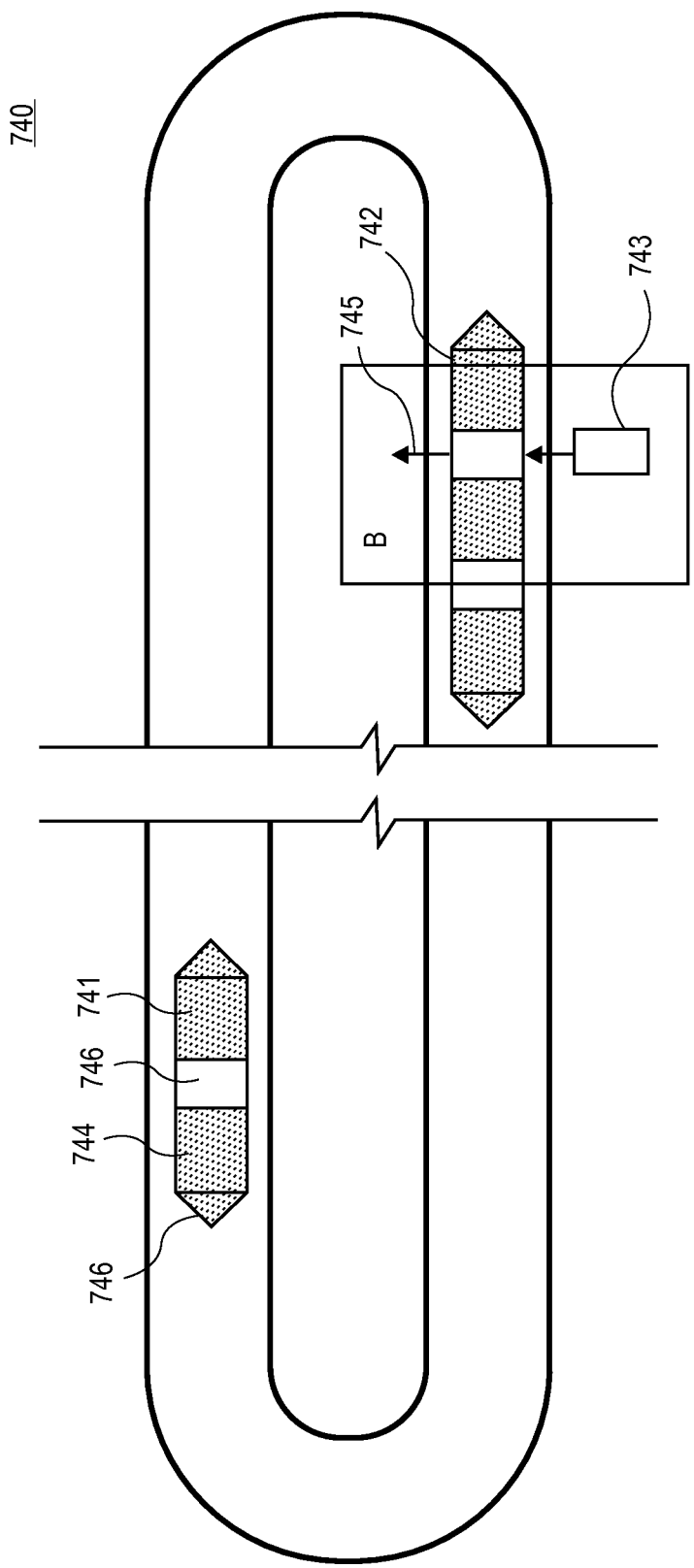
FIG. 7D is a longitudinal section view of an apparatus along a XOY plane defined by an OX axis and an OY axis according to another embodiment of the invention.

FIG. 7D is a longitudinal section view of an apparatus 700 along XOY plane defined by OX axis 732 and OY axis 734 according to another embodiment of the invention. As shown in FIG. 2A, an inner pipe has one or more transport elements, such as a transport element 741 and a transport element 742. The inner pipe has a transport element 741 in a shape of a capsule, as shown in FIG. 7D. As shown in FIG. 7D, the inner ring pipe is substituted by separate transport elements of a predetermined length. In one embodiment, the transport element, such as transport element 741 and transport element 742, are portions of the inner pipe. The transport element is placed inside the inner pipe. In one embodiment, the ends of the transport element, such as an end 746, are streamlined to reduce air resistance during movement.

As shown in FIG. 7D, transport element 741 has one or more transport modules, such as a module 746, and one or more working modules, such as a working module 744 connected to each other. Working modules of the transport element are filled with lighter-than-air gas. People/cargo are located within the transport modules. Transport elements, such as transport elements 741 and 742 move independently of each other inside outer pipe 702 without contacting the inside walls of the outer pipe 702 using methods and systems of moving and stopping as described above with respect to FIGS. 7A-7C. When the apparatus, as described above with respect to FIGS. 7A-7D is positioned horizontally in the air, under the ground or under the water, people/cargo are transported horizontally by movement of the inner pipe (as in FIG. 7B) or transport elements (as in FIG. 7D) relative to the immovable outer pipe. In least some embodiments, the apparatus based on an buoyancy force as described herein can be used to transport people in cities and between cities/destination points, cargo transportation in the air/under the water/under the ground. In least some embodiments, the apparatus based on a buoyancy force as described herein can be used as a pipeline, and more specifically, a gas pipeline.

In at least some embodiments, an outer pipe (e.g., a guide pipe) as described herein has a diameter about 7.5 m. In at least some embodiments, a working module as described herein has a diameter about 7 m, and a length about 25 m. In at least some embodiments, a transportation module as described herein has a diameter 7 m, length 2 m, a useable volume 35 m$^3$, and a floor space 12 m$^2$. In at least some embodiments, the inner pipe is moved continuously, as a travelator. The transported cargo can be fastened inside the continuously moving pipe. When the moving inner pipe reaches a predetermined point, the transported cargo is removed from the pipe.

In at least some embodiments, the transported cargo is moved by separate transport elements, which are pieces of the inner pipe having a length from about 50 m to about 1,000 m placed inside the outer guide pipe. In at least some embodiments, each of the modules, e.g., working and transport modules, has a frame made of light materials covered with gas impermeable shell having a low coefficient of air friction.

In at least some embodiments, a working module of the apparatus is filled with lighter-than-air-gas. A transport module of the apparatus is divided into upper and lower parts by a horizontal partition wall. The lower part is filled with lighter-than-air-gas. The upper part contains a useable space for people/cargo. The floor space of the upper part of the transport module is about 12 m$^2$ and the volume of the upper part of the transport module is about 35 m$^3$. A transport module to transport gas does not have a partition wall and is completely filled with the transported gas. In at least some embodiments, the guide pipe placed in the air is made of plastic or other light materials. In at least some embodiments, a pipe as shown in FIGS. 1-6 can be used as a guide pipe. In at least some embodiments, the guide pipe placed underwater or underground, is made of a material having a sufficient durability to be kept underground, underwater, or both.

In at least some embodiments, a diameter of the apparatus as described herein is commeasurable with the diameter of a wide-body airplane that is around 6 m. In at least some embodiments, transport parameters of the apparatus as described herein are as follows: travelling speed is about 700 km/hour, people transport capacity is about 10,000 people/hour if transport modules move at about 600 km/hour; cargo transport capacity is about 1,000 ton/hour if modules move at about 300 km/hour; gas transport capacity is about 20 millions m$^3$/hour if modules move at 80 km/hour, power of an engine to move the inner pipe 50 MW allowing for continuous circular movement of modules between destination points located 700 km apart at the speed of 500 km/hour.

The engine power is mostly used against air friction which is parallel to the direction of movement of the module surface. This power is commeasurable with the power of a typical electric locomotive engine that is around 10 MW. In at least some embodiments, apparatuses and methods based on a buoyancy force as described herein provide transportation in the air without support on the ground surface, transportation under the water without support on the bottom and without connection to devices floating on the water surface, or transportation under the ground.

Unlike existing airborne vehicles (air-balloons, airships), working and transport modules of the apparatus according to embodiments of the invention move inside a static structure guiding the movement (like a road) fixed to the ground surface. Unlike existing airborne vehicles (air-balloons, airships), working and transport modules of the apparatus according to embodiments of the invention provide long distance transportation by using an engine or energy source placed on the ground surface, not inside the apparatus. Unlike in existing airborne vehicles (air-balloons, airships), useful cargo is being transported continuously as if by a travelator, not a discretely by separate autonomous apparatuses according to at least some embodiments of the invention. Unlike existing airborne vehicles (air-balloons, airships), working and transport modules of the apparatus can move inside a guide pipe placed underwater or underground according to at least some embodiments of the invention. In at least some embodiments, a buoyancy force acting on the ring pipe is utilized to exclude friction between the static guide pipe and the moving ring pipe. In at least some embodiments, a direction of movement inside the apparatus as described herein is not influenced by the atmospheric winds. In at least some embodiments, no power is consumed to overcome wind resistance and drag when the structure of the apparatus moves.

Figure 8A:
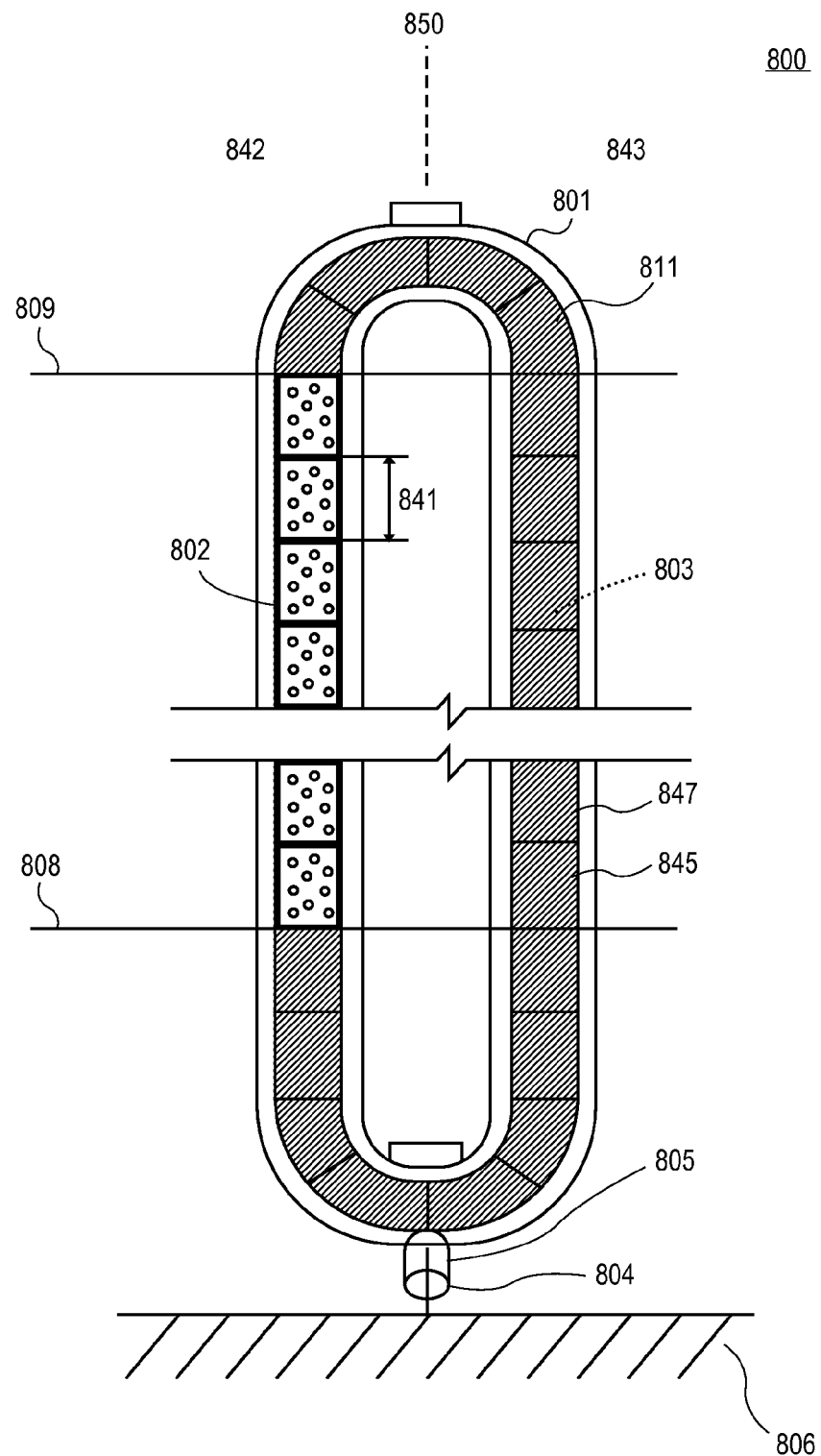
FIG. 8A is a longitudinal section view of an apparatus based on a buoyancy force according to another embodiment of the invention.

FIG. 8A is a cross-sectional view 800 of an apparatus based on a buoyancy force according to another embodiment of the invention. An apparatus comprises an outer ring pipe 801 and an inner ring pipe 811. The inner ring pipe 811 has one or more working modules containing a gas to create a buoyancy force, such as a module 845, and one or more transport modules, such as a module 847 to transport objects, e.g., people, cargo, or both, as described above. In one embodiment, each of the transport modules is adjacent to two of the working modules, and each of the working modules is adjacent to two of the transport modules so that the working modules and transport modules are interleaved along the ring pipe 811. For example, the transport and working modules of the pipe can be directly connected to each other (a working module is directly connected to each transport module and so on). The first gas 802 is lighter than the air 803. The apparatus is secured in a vertical stationary state at a predetermined distance relative to a location on the reference surface 806 without supporting the apparatus, as described above. In one embodiment, the pipe structure as shown in FIGS. 8A-8C is similar to the pipe structure shown in FIGS. 7A-7D, but in FIGS. 8A-8C the structure is placed vertically and has smaller dimensions. As shown in FIG. 8A, a shaft 804 is coupled via a drive 805 to the inner ring pipe 811 to transform an energy associated with moving of the inner ring pipe 811 into some other energy.

In one embodiment, a group of modules between levels 808 and 809 at a side 842 relative to a central axis 805 of the pipe 801 is referred as a first group of modules, and a group of modules other than the first Group along pipe 801 is referred as a second group of modules. As shown in FIG. 8A, the second group of modules contains the modules that are located at a side 843 relative to central axis 805, and the modules above level 809 and below level 808. The modules of each of the first group and the second group are working modules and transport modules, as described above. In one embodiment, the working modules of each of the groups are kept filled with the gas that is lighter than air. As shown in FIG. 8A, all (transport and working) modules of the first group are filled with a gas 802 (e.g., helium, hydrogen, hot air, or any other gas) that is lighter than air. In one embodiment, the transport modules of the second group are filled with air. In one embodiment, when transport module of the second group is moved above a level 808 of the apparatus, a lighter than air gas 802 substitutes the air 803 in the module, and the transport module transfers from the second group to the first group. When a transport module of the first group is moved above level 809 of the apparatus air 803 substitutes the lighter than air gas 802 in the module, and the transport module transfers from the first group to the second group.

In one embodiment, the length of one moving cycle involving substituting air with the lighter than air gas in a transport module at level 808 and substituting the lighter than air gas by air in a transport module at level 809 is equal to the height of one working module and one transport module. As described above, a working module is always filled with lighter than air gas. The function of the working modules is generation of a buoyancy force to position the apparatus in a stationary state. A buoyancy force generated by dynamical filling of the transport modules with lighter than air gas at a level 808 provides a rotational movement of the inner pipe 801.

As shown in FIG. 8A, each of the outer ring pipe and inner ring pipe of the apparatus has a shape of an elongated ring. In one embodiment, walls of the outer pipe can be close to each other on parallel sections, as described above with respect to FIG. 7A-2. As shown in FIG. 8A, inner ring pipe 811 is at a clearance distance from the outer ring pipe 801. The clearance maintaining system can be a magnetic system, a mechanical system, or a magnetic/mechanical system ensuring a clearance between the outer and inner pipes, as described above. In at least some embodiments, inner pipe 811 is moved based on a buoyancy force created by the gas that fills transport modules in the first group and a force associated with the gas that cross flows from an upper level to a lower level of the apparatus, as described in further detail below. During the cross-flow of gas from the upper level (e.g., level 809) to the lower level (e.g., 808) buoyancy force, which creates the movement, is being spent. The force being spent on the gas cross-flow is the force of movement resistance.

When the apparatus is placed vertically, as shown in FIG. 8A, the structure of the apparatus allows transforming the buoyancy force acting on the transport modules filled with gas into continuous rotational movement. In at least some embodiments, a cross-flow ring pipe (not shown) is coupled to inner ring pipe 811.

FIG. 8B is a longitudinal section view 810 of the apparatus as in FIG. 8A at a beginning of a moving cycle. FIG. 8C is a longitudinal-section view 820 of a portion of the apparatus as in FIG. 8B at an end of a moving cycle. As shown in FIGS. 8B and 8C, the apparatus has a cross-flow ring pipe 813 coupled to the inner ring pipe 811. As shown in FIGS. 8B and 8C, cross-flow pipe 813 contains gas 802. Cross-flow pipe has cross-flow pipe valves, such as a valve 839 and a valve 827, as shown in FIG. 8C. A piston 819 and a piston 821 are coupled to the inner ring pipe 811 and cross-flow ring pipe 813, as shown in FIGS. 8B and 8C. An atmospheric valve 823 and an atmospheric valve 831 are coupled to the inner ring pipe 811.

Piston 819 and piston 821 are placed in each transport module and can move from one end to the other. When every transport module passes level 808 and level 809, using mechanical, magnetic or mechanical/magnetic system, the pistons are being fixed in a stationery position relative to the outer pipe 801 for the period of time until piston 821 at level 809 reaches the lower end of the transport module, and piston 819 reaches the lower end of the transport module at level 808. Atmospheric valve is included in the structure of every transport module.

In at least some embodiments, the movement of the inner ring pipe 811 occurs due to a difference between a buoyancy force acting on the transport modules filled with gas 802 in Group 1 and a force required for the gas 802 to cross-flow via cross-flow pipe 813 from a transport module at upper level 809, e.g., a module 835 into a transport module at lower level 808, e.g., a module 837. As a result of a movement cycle, the inner ring 811 moves over a distance equal to the height of a working module and a transport module. By the end of a movement cycle gas cross-flows from the transport module 835 of Group 1 at the upper level 809 into the transport module 837 at the lower level 808, as shown in FIG. 8C. As a result of a movement cycle, the buoyancy force stops acting on the transport module 835 at level 809 and starts acting on the transport module 837 at level 808, as shown in FIG. 8C. In the course of a movement cycle a number of transport modules filled with gas in Group 1 does not change. The upper transport module at level 809 goes over from Group 1 to Group 2. At level 808, one transport module of Group 2 goes to Group 1.

As shown in FIGS. 8A-8C, the apparatus is placed vertically. The inner pipe 811 of the apparatus is formed by the working and transport modules attached to each other and positioned one after another. The inner pipe 811 is maintained at a predetermined position relative to the outer pipe 801. The walls of the inner and outer pipes do not contact each other by using, for example, a stabilizing magnetic/mechanical system, as described above. As shown in FIG. 8B, the transport modules, such as a module 835 are filled with gas (e.g., hydrogen, helium, a lighter than air gas). A total volume of the working modules contain the gas in the amount necessary to create a buoyancy force equal to a gravity force of an entire structure of the inner pipe and the gravity force of the air in all the transport modules. Every transport module of Group 1 is filled with gas. Transport modules of Group 2 are filled with air. Design of the working modules involves a gas-flow system. This system comprises a cross-flow ring pipe 813, an inside piston, such as a piston 819 and a piston 821, a cross-flow valve such as a valve 839 and a valve 827 and an atmospheric valve, such as valve 823 and valve 831.

The cross-flow ring pipe 813 goes inside the working and transport modules along the axis 814 of the inner pipe and is attached to the modules. In every transport module it has two valves: one at the upper end of the transport module and other at the bottom end of the transport module. These valves are used to fill and remove gas from the module through the cross-flow ring pipe.

In every transport module, there is an inside piston which divides the module into two parts. When the piston moves from one end of the transport module to the other, gas fills or is removed from the transport module and at the same time air is removed from or fills the transport module. Atmospheric valves are located in the upper and lower parts of every transport module and are used to fill/remove air from the air around. Cross-flow valves are placed on the cross-flow ring pipe 813 in every transport module in its upper and lower parts. The cross-flow system ensures cross-flow of gas from the transport module at level 809 into the transport module at level 808 which enters Group 1.

In the Group 1 transport module at level 809, position of the piston is fixed at level 809 using a magnetic or mechanical system. At the same time, position of the piston in the Group 1 transport module is fixed at level 808 using a similar system. When the inner ring moves over a length of one transport module, walls 815 of the working modules move relative to the fixed pistons. As a result, pistons 821 and 819 in modules at Levels 808 and 809 simultaneously reach the lower end in transport modules at Levels 808 and 809, as shown in FIG. 8C. And through the open lower cross-flow valve gas gets into the cross-flow pipe, from which it flows into the module at lower level 808 through the upper cross-flow valve opened in it. Through the open atmospheric valve in the upper part of the module at upper level 809 it will be filled with air 825.

Through the atmospheric valve in the lower part of the transport module at lower level 808 the air will be removed 830 from the transport module into the atmosphere. When the inner pipe moves over a distance equal to the height, for example a height 841 shown in FIG. 8A of a transport module, the upper level 809 module, such as module 835 is filled with air and the lower level 808 module, such as module 837 is filled with gas from the level 809 module. That is, during the moving of the inner pipe the gas 802 flows from at least a first portion of a first space (e.g., a space 817 of transport module 835 to at least a second portion of a second space, e.g. transport module 837.

The Group 1 modules move up in the air environment due to the buoyancy force acting on the transport modules entering Group 1. The Group 2 transport and working modules are in balance with the surrounding air environment and have no effect on the inner pipe movement. Thus, the inner ring pipe performs rotational movement due to the buoyancy force acting on the Group 1 transport modules filled with gas.

Rotational kinetic energy of the inner pipe 811 relative to the stationery outer pipe 801 can be transformed into rotational kinetic energy of a shaft 804 using a drive 805 or can be used for power generation. In order to generate electric power, the rotating inner pipe performs a function of a current generator rotor provided that specialized systems are used.

A kinetic energy of the inner pipe at the vertical section can be used for lifting people/cargo from level 808 to level 809 of the pipe. For this purpose a device with people/cargo is fixed to the transport module at level 808. When the pipe moves, the device lifts up over a prescribed distance between Levels 808 and 809. The apparatus can act as an elevator.

In at least some embodiments, an apparatus based on a buoyancy force as described herein in FIGS. 8A-8C acts as rotational movement generator. In at least some embodiments, during operation of the generator a lighter-than-air gas (hydrogen, helium) is being spent due to diffusion through the structure surface. In at least some embodiments, dimensions of an apparatus to generate power of about 150 KW based on a rotational movement as described herein can be as follows: height is about 50 m, diameter of a static outer (guide) pipe is about 8.2 m, diameter of a working module is about 8 m, length of the working module is about 4 m, diameter of a transport module is about 8 m, length of the working module is about 3 m, diameter of a cross-flow pipe is about 3 m.

In at least some embodiments, each of the working and transport modules comprises a frame made of light materials covered with gas impermeable shell having a low coefficient of air friction. A working module is filled with lighter-than-air-gas. A transport module depending on its location is filled either with air or gas. In at least some embodiments, the apparatus as described herein with respect to FIGS. 8A-8C operates without friction between moving and immovable structure elements. In at least some embodiments, the power generated by the apparatus based the buoyancy force as in FIGS. 8A-8C is not used to overcome friction between moving (moving ring pipe) and immovable structure elements (e.g., static guide pipe). In at least some embodiments, the apparatus as described herein with respect to FIGS. 8A-8C generates power mostly to ensure cross-flow of gas from the transport module at an upper level into the transport module at a lower level. In at least some embodiments, power of the apparatus as described herein with respect to FIGS. 8A-8C is determined only by the diameter of the transport modules and height of the structure. In at least some embodiments, the apparatus as described herein does not require building of any foundation or other supporting structures because the apparatus is balanced in the air. In at least some embodiments, the apparatus as described herein does not have products of combustion.

In the foregoing specification, embodiments of the invention have been described with reference to specific exemplary embodiments thereof. It will be evident that various modifications may be made thereto without departing from the broader spirit and scope of the invention. The specification and drawings are, accordingly, to be regarded in an illustrative sense rather than a restrictive sense.

What is claimed is:

1. An apparatus for generating electrical power from kinetic energy of natural air flows, the apparatus comprising:
   a first pipe having a first diameter, the first pipe including a first lower end and a first upper end with a first diameter;
   a second pipe having a second diameter that is smaller than the first diameter, the second pipe including a second lower end and a second upper end, wherein the second pipe is disposed centrally within the first pipe, wherein the first lower end of the first pipe is connected with the second lower end of the second pipe and the first upper end of the first pipe is connected with the second upper end of the second pipe to form a gap that is sealed between the first pipe and the second pipe, wherein the gap between the first pipe and the second pipe is filled with a first gas that is lighter than air, wherein the first gas is in an amount to generate a buoyancy force that exceeds at least a gravity force of the apparatus to vertically position the apparatus in a stationary state at a first distance relative to a ground;
   a first fixture coupled to the first lower end of the first pipe and the second lower end of the second pipe to secure the apparatus in the stationary state at the first distance relative to the ground without supporting the gravity force of the apparatus, wherein a second space within the second pipe allows air naturally flow upwardly from the second lower end towards the second upper end to create kinetic energy flowing inside the second pipe;
   a heat source coupled to the first lower end of the first pipe and the second lower end of the second pipe to cause the air naturally flowing upwardly within the second pipe to generate the kinetic energy flowing inside the second pipe; and
   a wind propeller disposed within the second pipe to convert a progressive motion of the kinetic energy of naturally flowing air to a rotational motion and to generate electric power based on the rotational motion.

2. The apparatus of claim 1, wherein the first gas is one of helium and hydrogen.

3. The apparatus of claim 2, wherein the first lower end and the second lower end are maintained with a first temperature, and wherein the first temperature is higher than a second temperature around the first upper end and the second upper end to enable the air naturally flowing upwardly within the second pipe.

4. The apparatus of claim 1, wherein a length of the first pipe and second pipe is ranging from 1000 to 5000 meters.

5. The apparatus of claim 4, wherein the first diameter of the first pipe is ranging from 16 to 30 meters.

6. The apparatus of claim 5, wherein the first diameter of the first pipe is approximately 20 meters.

7. The apparatus of claim 6, wherein the first distance is ranging from 1 to 20 meters.

8. The apparatus of claim 1, wherein the gap comprises one or more first sections.

9. The apparatus of claim 3, wherein the first pipe is made of metalized lavsan.

10. The apparatus of claim 3, wherein the first pipe is made of metalized nylon fabric.

11. The apparatus of claim 3, further comprising an energy converter within the second pipe to convert kinetic energy resulted from the air flowing upwardly within the second pipe to electrical energy.

12. The apparatus of claim 1, wherein first gas has a first pressure, and the air within the second pipe has a second pressure that is no greater than the first pressure.

13. The apparatus of claim 4, wherein the length of the first pipe and the second pipe is approximately 2000 meters.

14. The apparatus of claim 4, wherein the second diameter of the second pipe is ranging from 15-25 meters.

15. The apparatus of claim 14, wherein the second diameter of the second pipe is approximately 18 meters.

* * * * *